(12) United States Patent
Royer

(10) Patent No.: US 7,571,472 B2
(45) Date of Patent: Aug. 4, 2009

(54) METHODS AND APPARATUS FOR CREDENTIAL VALIDATION

(75) Inventor: Coby Royer, St. Louis, MO (US)

(73) Assignee: American Express Travel Related Services Company, Inc., New York, NY (US)

(*) Notice: Subject to any disclaimer, the term of this patent is extended or adjusted under 35 U.S.C. 154(b) by 143 days.

(21) Appl. No.: 10/331,459

(22) Filed: Dec. 30, 2002

(65) Prior Publication Data

US 2004/0128502 A1 Jul. 1, 2004

(51) Int. Cl.
G06F 7/04 (2006.01)
G06F 17/30 (2006.01)
H04L 9/32 (2006.01)
G06F 15/16 (2006.01)
G06F 13/00 (2006.01)

(52) U.S. Cl. .................. 726/19; 726/7; 713/186; 902/3; 382/115; 340/5.52; 340/5.82

(58) Field of Classification Search .......... 713/156, 713/186, 176, 179; 380/30; 704/239; 726/7, 726/30, 19; 902/3; 382/115; 340/5.52, 5.82
See application file for complete search history.

(56) References Cited

U.S. PATENT DOCUMENTS

| | | | | |
|---|---|---|---|---|
| 5,659,616 A * | 8/1997 | Sudia | ........................... | 705/76 |
| 5,825,880 A * | 10/1998 | Sudia et al. | ................. | 713/180 |
| 5,892,824 A * | 4/1999 | Beatson et al. | .............. | 713/186 |
| 5,973,731 A * | 10/1999 | Schwab | ....................... | 348/161 |
| 6,038,315 A * | 3/2000 | Strait et al. | ................. | 713/183 |
| 6,076,167 A * | 6/2000 | Borza | ............................. | 726/5 |
| 6,160,903 A * | 12/2000 | Hamid et al. | ............... | 382/115 |
| 6,256,737 B1 * | 7/2001 | Bianco et al. | .............. | 713/186 |
| 6,484,260 B1 * | 11/2002 | Scott et al. | ................. | 713/186 |
| 6,532,298 B1 * | 3/2003 | Cambier et al. | ............. | 382/117 |
| 6,615,158 B2 * | 9/2003 | Wenzel et al. | ............... | 702/183 |
| 6,775,775 B1 * | 8/2004 | Yoshiura et al. | ............. | 713/186 |
| 6,957,337 B1 * | 10/2005 | Chainer et al. | .............. | 713/186 |
| 7,086,085 B1 * | 8/2006 | Brown et al. | ................... | 726/7 |
| 7,174,463 B2 * | 2/2007 | Cromer et al. | .............. | 713/186 |

(Continued)

OTHER PUBLICATIONS

France, Robert K. "Weights and measures: an axiomatic model for similarity computations." Internal Report, Virginia Tech, 1994.*

(Continued)

Primary Examiner—Michael J Simitoski
(74) Attorney, Agent, or Firm—Snell & Wilmer L.L.P.

(57) ABSTRACT

A secure credential validation compares stored and received modified credentials, e.g., biometric credentials, such that the validating system does not have access to the unmodified credentials. A capture system and a credential validation system are operatively coupled to a network (e.g., the Internet). The credential validation system is configured to store a set of modified stored credentials associated with the principal, receive a set of modified received credentials, and perform a credential validation procedure to validate the modified received credentials, wherein the credential validation procedure performs a one-way consistency test to compare the modified stored credentials and the modified received credentials: The credential validation procedure employs one or more similarity measures, e.g., a weighted quorum of exact matches, a discrete N-ball (or "N-shell") intersection, or a client-based algorithm with encryption.

15 Claims, 4 Drawing Sheets

U.S. PATENT DOCUMENTS

| | | | | |
|---|---|---|---|---|
| 7,269,737 | B2* | 9/2007 | Robinson | 713/186 |
| 7,287,158 | B2* | 10/2007 | Futamura et al. | 713/156 |
| 7,318,235 | B2* | 1/2008 | Grawrock | 726/26 |
| 7,356,705 | B2* | 4/2008 | Ting | 713/186 |
| 2001/0039619 | A1* | 11/2001 | Lapere et al. | 713/186 |
| 2002/0146154 | A1* | 10/2002 | Davis et al. | 382/115 |
| 2002/0174346 | A1* | 11/2002 | Ting | 713/186 |
| 2003/0005310 | A1* | 1/2003 | Shinzaki | 713/186 |
| 2003/0037004 | A1* | 2/2003 | Buffum et al. | 705/51 |
| 2003/0088782 | A1* | 5/2003 | Forrest | 713/186 |
| 2003/0115475 | A1* | 6/2003 | Russo et al. | 713/186 |
| 2003/0140233 | A1* | 7/2003 | Samar | 713/186 |
| 2003/0188201 | A1* | 10/2003 | Venkataramappa | 713/202 |
| 2003/0197593 | A1* | 10/2003 | Siegel et al. | 340/5.52 |
| 2008/0019573 | A1* | 1/2008 | Baltatu et al. | 382/115 |

OTHER PUBLICATIONS

Ng, Y. H. and Barros, S. P. 1988. Active memory for text information retrieval. Proceedings of the 11th Annual international ACM SIGIR Conference on Research and Development in information Retrieval (Grenoble, France). Y. Chiaramella, Ed. SIGIR '88.*

Schneier, Bruce. Applied Cryptography, Second Edition. 1996 John Wiley & Sons, Inc., pp. 31-38.*

Chen, Liqun et al. "On Enhancing Biometric Authentication with Data Protection", 2000 IEEE.*

Datta, Anwitaman et al. "Beyond "web of trust": Enabling P2P E-commerce", 2003.*

Davida, George I. et al. "On Enabling Secure Applications Through Off-Line Biometric Identification".*

Isobe, Yoshiaki et al. "Development of Personal Authentication System Using Fingerprint with Digital Signature Technologies", 2001 IEEE.*

Laili, Muhammad Hafiz et al. "Secured Network Authentication Using Biometrics Application", 2002 IEEE.*

Lee, J.K. et al. "Fingerprint-based remote user authentication scheme using smart cards", 2002 IEE.*

Podio, Fernando L. "Personal Authentication Through Biometric Technologies".*

Schneier, Bruce. Applied Cryptography, Second Edition, 1996 John Wiley & Sons, p. 30.*

Smoot, Steve. "Weighted Voting", Nov. 1995, <http://bmrc.berkeley.edu/people/smoot/papers/code/node3.html>.*

*Unix Manual Page for "nisaddcred,"* Jun. 14, 2001.

* cited by examiner

METHODS AND APPARATUS FOR CREDENTIAL VALIDATION

FIELD OF THE INVENTION

The present invention generally relates to credential validation in a distributed environment and, more particularly, to systems and methods for validating the credentials of a user to a target system without revealing the actual credentials to that system.

BACKGROUND OF THE INVENTION

On-line communication often involves one party supplying credentials to another party for the purpose of authenticating those credentials. In this regard, credentials are generally defined as anything used to identify an entity, user, system, or principal, and typically includes data related to what the entity knows, what the entity has, and/or what the entity is.

In the context of distributed electronic systems, a credential might typically include a digital representation of a physical credential. For example, an individual's fingerprint might be a credential, but in a biometric-based system some rendering of the fingerprint is converted to digital form to produce the biometric credential. When a credential is biometric, the creation of the digital credential entails a digitization process which relies on an interface system, such as a fingerprint reader. Other interface systems include, for example, smart card readers, keyboards, display screens, and/or the like.

Credential validation is often employed by secure systems that limit access to that system's functionality based on the identity of a principal. Typically, only those principals who have been specifically authenticated and granted access may use a secure system. Thus, credential validation may be an important pail of authentication. In some systems, a principal provides separate information for identification and credentials—for example, a user ID and a password. In other systems, the credentials are used to deduce the identity of the user.

In a simple, non-distributed environment, the principal usually provides credentials directly to the secure system to which access is desired. The system may optionally include an interface system. The system often follows an algorithmic procedure to validate the credentials, and during the process of authentication, the credentials may be transmitted through software and/or other components of the secure system, including the interface system, and may also be stored in some digital form within the system. For example, the credentials may be stored in the computer's random access memory (RAM), and/or memory that has been swapped onto any other recordable media by the operating system.

When using such a system, the principal often trusts the ability of the system to protect the credentials from identity theft, wherein identity theft refers to the act of a fraudulent entity obtaining information, typically credentials, that allows the identity thief to pose as some other principal. For example, an ID and password could be used in order to pose as the principal to whom the ID and credential were originally issued. The risks of identity theft usually fall into four general categories: trustworthiness of the receiving system, domain of acceptance, weighted risk in domain of acceptance, and domain risk similarity.

The trustworthiness of the receiving system often relates to the ability of a receiving system to rebuff both intentional and unintentional dissemination of credentials, wherein the receiving system is a specific secure system to which a credential set is provided by a principal. For example, a system that stores IDs and passwords in a plaintext database on a publicly available and possibly hack-able public server would typically not be considered trustworthy.

Domain of acceptance typically refers to the number of systems that accept a credential set. The larger the domain of acceptance, the larger the potential risk. For example, theft of a password used by a principal to access a single system would be less damaging than theft of a password that is used for many systems. Theft of a social security number (especially in combination with other information, such as address history) can be especially damaging, as social security numbers have a very broad domain of acceptance. It is important to recognize that the damage due to theft of credentials may span the entire domain of acceptance and not just the receiving system from which the credentials were taken.

Weighted Risk in Domain of Acceptance typically refers to the fact that the amount of risk correlates not just to the number of systems that accept a credential set, but also to the collective damage that could be done within that domain. An ID and password for six non-transactional merchants would exhibit less risk than an ID and password to a single transactional merchant where on-line purchases could be billed to a payment vehicle. The weighted risk usually represents the potential damage in the domain of acceptance, and may be viewed as the summation of the product of cost and probability of each risk event within the domain.

Domain Risk Similarity often relates to whether and to what extent weighted risk is distributed equally across each of the receiving systems in the domain of acceptance. The difficulty in compromising each system, and of stealing a credential set, is similar across each system exhibiting domain risk similarity. For example, it would be poor practice to include a social security number to simply browse a website, given that other systems that use social security number have significantly higher weighted risk. A consequence is that users would be reluctant to use such a site.

Distributed systems usually pose special risks in trustworthiness of the receiving system and domain of acceptance. Some distributed systems use distinct machines or subsystems to perform credential validation, i.e., authentication servers. As such, the receiving system into which credentials are entered is different than the credential validating system. There are distinct architectural and security advantages to computer systems that utilize authentication servers to validate credentials. However, this configuration includes passage of information between the receiving system and the validating system. This passage of information can increase risk and hence reduce the trustworthiness of the receiving system. For example, if a plaintext ID and password are passed from a web browser to a web server on the public Internet, there is considerable risk. This risk is often referred to as transmission eavesdropper risk.

Transmission eavesdropper risk addresses concerns over what happens to credentials when they are passed across a network. However, risk should be analyzed by looking at where and in what form credentials exist at all times and places within the overall system. For example, encryption of credentials during transmission to the authentication system does not protect against theft of unencrypted data in a compromised database server. And even if the database fields are encrypted, an unscrupulous technician might steal credentials and perpetrate identity theft if plaintext credentials exist anywhere in the receiving or validating systems.

Furthermore, theft from systems risk is often overlooked, and protection against this kind of theft is a major shortcoming of prior art systems. As digital identities are gaining widespread usage on the Internet, separation of receiving system and validating system is also becoming more widespread. At the same time, biometric credentials are increasingly viewed as a valuable way to minimize risks in authentication. A major problem not sufficiently addressed by the prior art is how to provide credentials in a biometric-based, distributed, authentication environment that provides very high resistance to identity theft. Moreover, there are certain classes of credentials (for example, biometric credentials) whose characteristics lead to security threats when supporting distributed authentication.

The present trend in authentication is to standardize on a small set of credentials with a large domain of acceptance. Furthermore, there is a growing interest in the use of biometric credentials. However, the introduction of biometric credentials into a distributed environment creates a new problem that has not been previously encountered.

Principals and related entities have a strong desire to prevent identity theft. Theft of a credit card account password for a user might result in fraudulent charges on the user's account. Theft of a digital certificate used by an online service might result in fraudulent transactions. There are a number of practices that protect against eavesdropper and systems theft risks. Credentials are often encrypted during transmission to prevent eavesdropping, for example, through the use of SSL during web login. Similarly, credentials are often encrypted in underlying authentication server databases to reduce the risk of systems theft if a database server is hacked or otherwise compromised. Credentials may also be encrypted, hashed, masked, and/or otherwise altered at the point of entry. For example, password entry fields are usually masked so as to be unreadable by someone looking over the shoulder of a user. Traditional UNIX logon performs a one way hash on a password after it has been entered. Some systems, such as fingerprint-based authenticators, are closed systems that are completely self-contained and do not pass credential data outside of the authentication system hardware.

Analysis of the risk of systems theft often includes an understanding of the core processes that involve credentials and the ways in which credentials are represented. Specifically, if at any point in the processing of a credential, either as stored in a system of record or as provided from the principal, the credential is represented explicitly or in a way that can be algorithmically transformed, and this representation of the credential would be accepted by the receiving system or any system in the domain of acceptance, then there is a risk.

On-line access usually includes a series of basic processes. The first process is typically registration, wherein a new user is added to the database of the underlying authentication, possibly using some initial credentials. For example, new users may be assigned an initial password so that they can log on to the system. In the case of biometric authentication, initial biometric credentials may be collected and entered into the authentication system. This process will typically either store the digital credentials in the database, or store them in the database in some modified form. The second core process is usually authentication, which entails credential validation and as discussed above, may also entail identification of the user. Other processes include maintenance, which is supported under some systems and which allows a user to modify credentials, and revocation, which removes or inactivates a user's credentials in the underlying authentication system.

With respect to credential validation, the authentication process typically proceeds as follows. First, presented credentials are provided by the receiving system and may be represented in some modified form. To distinguish this modified form from the raw form, such credentials are referred to herein as modified presented credentials. For example, there may be an authentication application programming interface (API) that accepts a user ID and one-way hashed password, and which returns an access control list for the user. Identification is also suitably provided by the receiving system. The validation then uses the identification to retrieve information from an underlying data store which typically includes some form of the credentials. These will be referred to herein as modified stored credentials. At the time of registration or maintenance, the user will have supplied stored credentials that were then converted to the modified stored credentials. Note that there are other variants of this approach, but most prior art systems are similar. Ultimately, the validation process seeks to determine whether presented credentials are consistent with the stored credentials. In order to do so, the algorithmic procedure accepts as input the modified presented credentials and the modified stored credentials.

Given this approach, there are several variations that are seen in the industry today. Raw Equivalence—the simplest and riskiest approach—is where there is no modification of credentials, e.g., plain text passwords. That is, the modified presented credentials are equivalent to the presented credentials, and the modified stored credentials are equivalent to the stored credentials. The algorithmic procedure involves a simple equality test: If the modified presented credentials are equal to the modified stored credentials, then the presented credentials are considered consistent with the stored credentials.

One-way hash equivalence is a much improved approach that uses a special algorithm called a one-way hash. A one-way hash is easy to compute from an input, but the original input is impossible to compute from the output. The algorithm is applied to the stored credential to obtain the modified stored credential at the time of registration or maintenance. The same algorithm is then applied to the presented credential to obtain the modified presented credential during validation. Once again, the algorithmic procedure is a simple equality test: If the modified presented credentials are equal to the modified stored credentials, then the presented credentials are considered consistent with the stored credentials. This approach is employed under the UNIX operating system, and makes the system resistant to system theft as the password of a user never exists in unmodified form on the system. One additional characteristic is important to the successful reduction of risk—the one way hash uses a shared secret that is exchanged between the receiving system and authentication system. In this way, an eavesdropper could not replay the submission of an ID and modified presented credential to gain access.

Cryptographic Equivalence is a variation on one-way hash equivalence which uses cryptographic means, such as, for example, digital signature with an asymmetric key, to modify credentials. Again, equality comparison is usually used for validation and credentials might typically include X.509 certificates, which are based on asymmetric key cryptography. In general, one-way hash and cryptographic mechanisms described above rely on an algorithm that has two properties: (1) it is easy to compute in one direction only; and (2) its application includes additional information known only to the receiving system and authentication system.

In general, this class of approach will be referred to herein as One-Way approaches, and the above two schemes can be generalized as One-Way Equivalence. Approaches that are not one-way, i.e., those that do not modify credentials, will be referred to herein as Raw.

Determination of consistency between the presented credentials and the stored credentials in biometric authentication does not typically, however, use simple equivalence. Biometric credentials usually consist of a sometimes large set of data collection points, such as light density or electrical capacitance over a two dimensional array. Biometric credentials may be transformed by various feature-extracting algorithms, but will still consist of a collection of data points. The significance of the data points is that there is not typically an exact match between the presented credentials and the stored credentials. Whereas comparing passwords is simply an equality test, comparing two representations of scanned fingerprints, retinas, handwriting, and/or the like, is complex, algorithmic, and inexact.

Pattern matching algorithms are employed to compare biometric data sets, and typically consist of feature extraction followed by scoring of matched features. When the score exceeds a prescribed threshold, then the presented credentials are considered to be consistent with the stored credentials. The crucial observation about this type of credential is that the test for consistency is not equivalence. As used herein, when distinguishing such a comparison from equivalence, it will be designated non-equivalent consistency.

Raw consistency often occurs when the modified presented credentials are equivalent to the presented credentials and the modified stored credentials are equivalent to the stored credentials. The algorithmic procedure tests for consistency by some means other than equality, presumably performing pattern matching with some similarity threshold. A variation on raw consistency allows initial feature extraction to create the credential set from the raw biometric input. Raw approaches therefore have inherent systems theft risk. An individual may steal credentials if he or she gains access to an authentication system. Moreover, the owner of the system might choose to use the credentials in ways that the provider of the credentials does not wish. In accordance with known prior art systems, biometrics are, for the most part, only usable in the raw approach. For example, minute variations in the generation of a fingerprint scan will often cause two scans from the same finger to never be identical. Therefore, the system that performs the validation includes unmodified credential sets to perform the consistency test such that biometric based authentication systems are subject to systems theft risk.

Biometrics also exhibit another property that heightens risk and underlies the need to minimize likelihood of credential theft. Whereas a system password can be readily changed, and a user may choose to utilize many different passwords on many different systems, fingerprints and other biometrics do not change significantly. Their invariance is one of the properties that makes them useful as credentials. However, as biometric systems are increasingly adopted, the domain of acceptance grows. For example, a user can not change the images of their retinas, so the domain of acceptance would be the same size as the number of systems employing retinal scan authentication. This is in contrast to password or digital certificate authentication, where different credential sets can be employed for different systems, even though those systems employ the same type of credentials. And even in the case where the same credential is employed for different systems, passwords and certificates can be protected by a one-way algorithm as described above. In summary, biometrics pose special risks due to potentially large domain of acceptance and reliance on a raw validation approach.

From the perspective of a user, a security-savvy entity may choose not to provide credentials to systems that can not assure them positively that the system can prevent undesired use of credentials, whether intentional or unintentional. Conventional systems often do not employ biometric credentials, and can follow the one-way equivalence approach described above to achieve minimal systems theft risk. On the other hand, conventional systems that use biometric credentials employ the raw consistency approach defined above. As such they often exhibit systems theft risk.

Biometric systems may often be self-contained, incorporating the credential database into the same hardware as the biometric interface, or at least integrating the system components in a way that would make theft of data very difficult. Physical security can also be relied upon in such a system as surveillance and physical security personnel can reduce likelihood of tampering with such systems. When the systems are not self-contained, the risk associated with raw credential validation can be mitigated by providing higher security around the authentication server. For example, a physical access control system for a building might use a centralized authentication server that is not connected to the Internet. Although users who provide their credentials to the interface systems are in fact at some slight risk of credential theft, they are comfortable in their belief that their credentials will not be transmitted outside of the closed security system. In applications where validation by raw consistency is desired (typically but not necessarily biometrics), encryption and special attention to systems design can mitigate risk of systems theft. Transmission eavesdropper risk can be sufficiently mitigated by encryption such as SSL. However, the systems theft risk can not be completely obviated so long as an unmodified form of the credential set is desired for consistency testing.

Systems and methods are therefore needed to overcome these and other shortcomings of the prior art.

SUMMARY OF THE INVENTION

Systems and methods in accordance with the present invention facilitate secure credential validation through the comparison of modified credentials, e.g., biometric credentials, such that the validating system does not have sufficient access to the unmodified credentials. In accordance with one embodiment of the present invention, a capture system and a credential validation system are operatively coupled to a network (e.g., the Internet). The credential validation system is configured to facilitate storing a set of modified stored credentials associated with the principal, receiving a set of modified received credentials, and performing a credential validation procedure to validate the modified received credentials, wherein the credential validation procedure facilitates performing a one-way consistency test to compare the modified stored credentials and the modified received credentials.

In accordance with various aspects of the present invention, the credential validation procedure employs one or more similarity measures, e.g., a weighted quorum of exact matches, a discrete N-ball (or "N-shell") intersection, and/or a client-based algorithm with encryption.

BRIEF DESCRIPTION OF EXEMPLARY DRAWINGS

Additional aspects of the present invention are evident upon reviewing the non-limiting embodiments described in the specification and the claims, in conjunction with the accompanying figures, wherein like numerals designate like elements:

Figure 1:
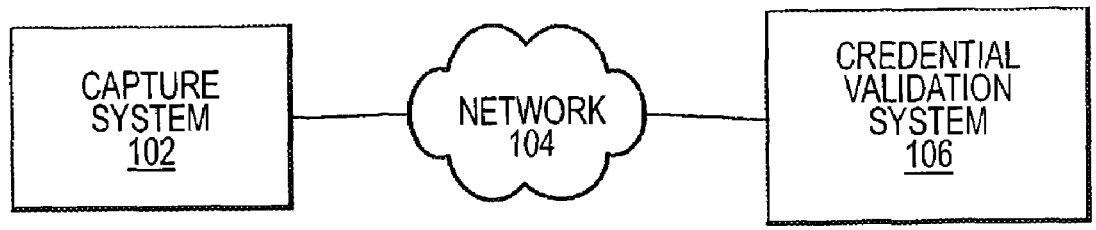
FIG. 1 depicts an exemplary distributed system in which the systems and methods of the present invention may be employed.

Elements in the figures are illustrated for simplicity and clarity and have not necessarily been drawn to scale. For example, the dimensions of some of the elements in the figures may be exaggerated relative to other elements to improve understanding of embodiments of the present invention.

DETAILED DESCRIPTION OF EXEMPLARY EMBODIMENTS

The present invention provides an approach to validation that employs comparison of modified credentials (e.g., biometric credentials) such that the validating system does not have access to, does not have adequate access to or has limited access to, the actual unmodified credentials. More particularly, the present invention utilizes one-way consistency for credentials that include algorithmic consistency tests based on similarity measures, notably, biometric credentials.

In this regard, various aspects and features of the present invention may be described in terms of functional components and steps. Such functional components and steps may be realized by any number of elements and/or steps configured to perform the specified functions. For example, the present methods and apparatus may employ electronic, signaling, and logic elements which may carry out a variety of functions in various embodiments, applications, and environments. In addition, the present methods and apparatus may be practiced in conjunction with any number of procedures and systems, and the apparatus and methods described are merely exemplary applications for the invention. Conventional cryptographic techniques will not be discussed in detail, as such technology is well summarized in a number of references, including *Applied Cryptography*, by Bruce Schneier, which is hereby incorporated by reference.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

Furthermore, the various systems may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, the capture system and other any other computer systems will typically include an operating system (e.g., Windows NT, 95/98/2000, Linux, Solaris, etc.) as well as various conventional support software and drivers typically associated with computers. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The various databases described herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art.

Finally, the term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

Referring now to the general network diagram shown in FIG. 1, a capture system 102 and credential validation system 106 are operatively coupled to a network 104, wherein network 104 comprises any suitable data communication network now known or later developed (e.g., the Internet, a wide-area-network, a local-area-network, wireless network, optical network, and/or the like). Capture system 102 is configured to interface with a "principal" or "user" (e.g., an individual, group, entity, organization, business, hardware and/or software) whose credentials are to be validated. In this regard, capture system 102 may comprise any combination of hardware and software components such as one or more CPUs, keyboards, monitors, smart-card readers, and/or biometric interface devices. Similarly, credential validation system 106 (also referred to as a "receiving system" or "authenticating server") comprises any suitable combination of hardware, software, and database components configured to perform the various processes outlined below.

Figure 2:
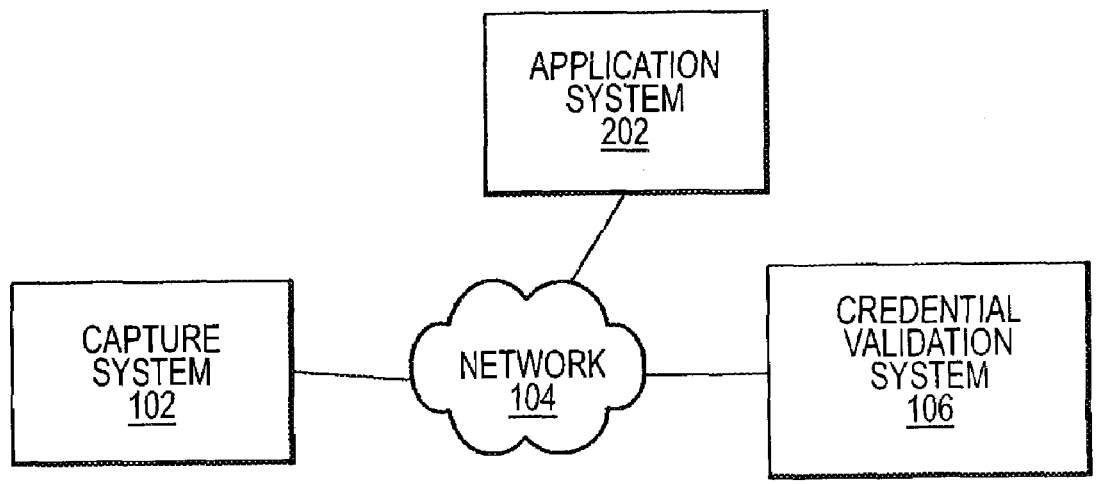
FIG. 2 depicts an alternate distributed system including an optional application system.

In accordance with one embodiment of the present invention, as shown in FIG. 2, capture system 102 and credential validation system 106 ("credential validator") are configured on network 104 along with an application system 202. Application system 202 generally comprises software functionality to which the principal wishes to gain access. The ultimate purpose of these elements is to allow the application system to perform work on behalf of the principal, after having validated credentials that are captured from the principal.

Figure 3:
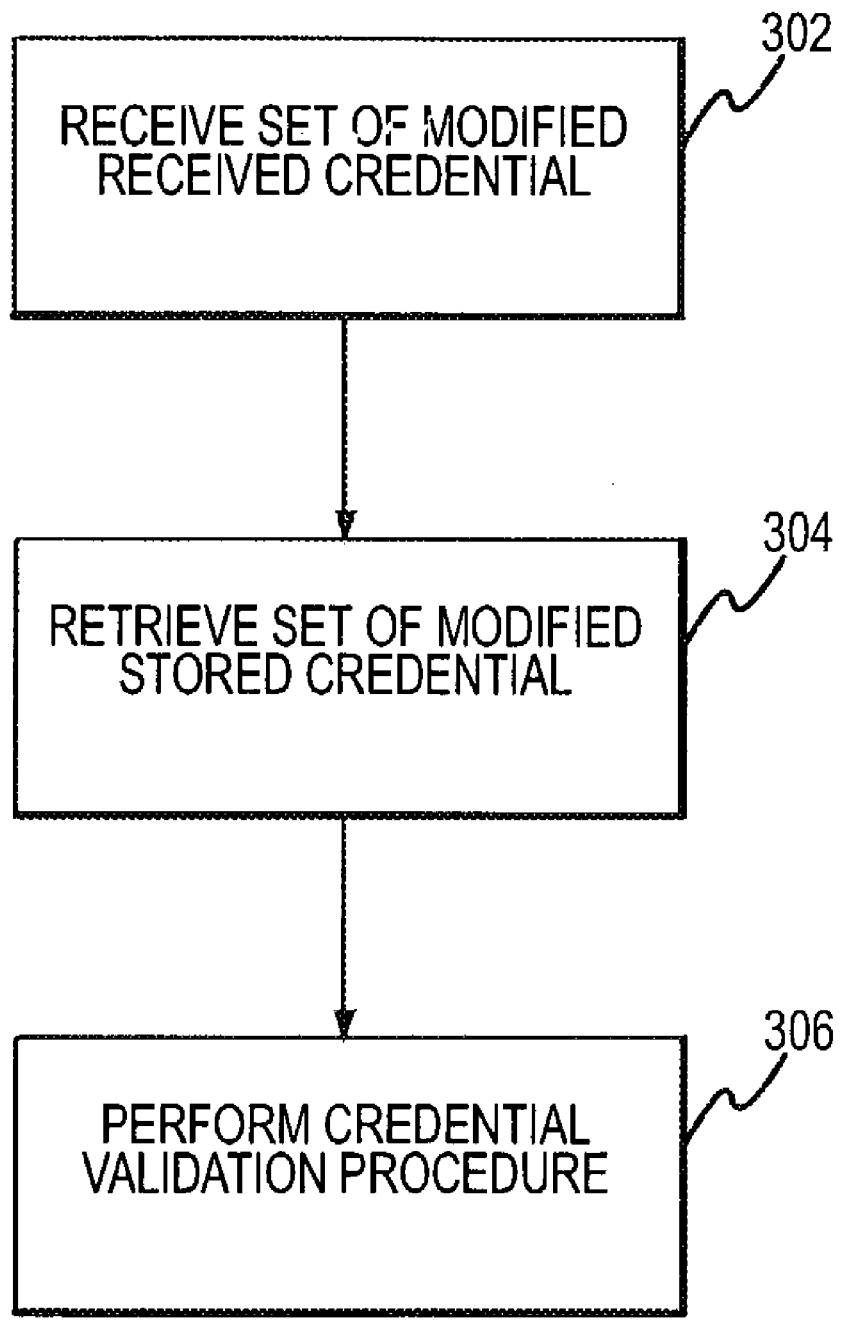
FIG. 3 depicts a general credential validation method in accordance with one embodiment of the present invention.

Having thus given a general overview of the context in which credential validation takes place, an overview of an exemplary validation procedure itself will now be outlined. Generally, when a user engages capture system 102 with the aim of accessing application system 202, a the system facilitates creation of a modified presented credentials via a one-way or cryptographic algorithm. A set of previously-created modified stored credentials (which, in one embodiment, are stored within credential validation system 106) are created by a one-way or cryptographic algorithm which may be the same or different as the one used for modification of the presented credentials. A credential validation procedure is used to test the consistency of the modified stored credentials vis-à-vis the modified received credentials. That is, referring to the general flowchart shown in FIG. 3, a set of modified received credentials are received by the credential validation system (step 302), which then facilitates retrieving the corresponding set of modified stored credentials (step 304). The system then facilitates a credential validation procedure (step 306) as described in detail below. This algorithmic procedure tests for consistency by some means other than equality, e.g., performing pattern matching with some similarity threshold, operating with the modified credentials (stored and received) as input. Initial feature extraction may be applied in creation of the modified credentials from the raw biometric input. A variety of one-way functions and consistency tests may be employed in connection with this process.

In on embodiment of the invention, the one-way function is computed from the credential sets. Additionally, the formulation of the credential set itself from raw biometric or other input optionally involves feature extraction and/or other computation, depending on the nature of the input. Inputs may vary considerably across the embodiments and applications of the invention, and could simply be a sequence of responses to questions on a web form, and/or a set of extracted features such as handwriting features, retinal scan features, voice stress analysis features, fingerprint features, and any combination of these or other features. This feature extraction and other computation is referred to as preprocessing.

Figure 4:
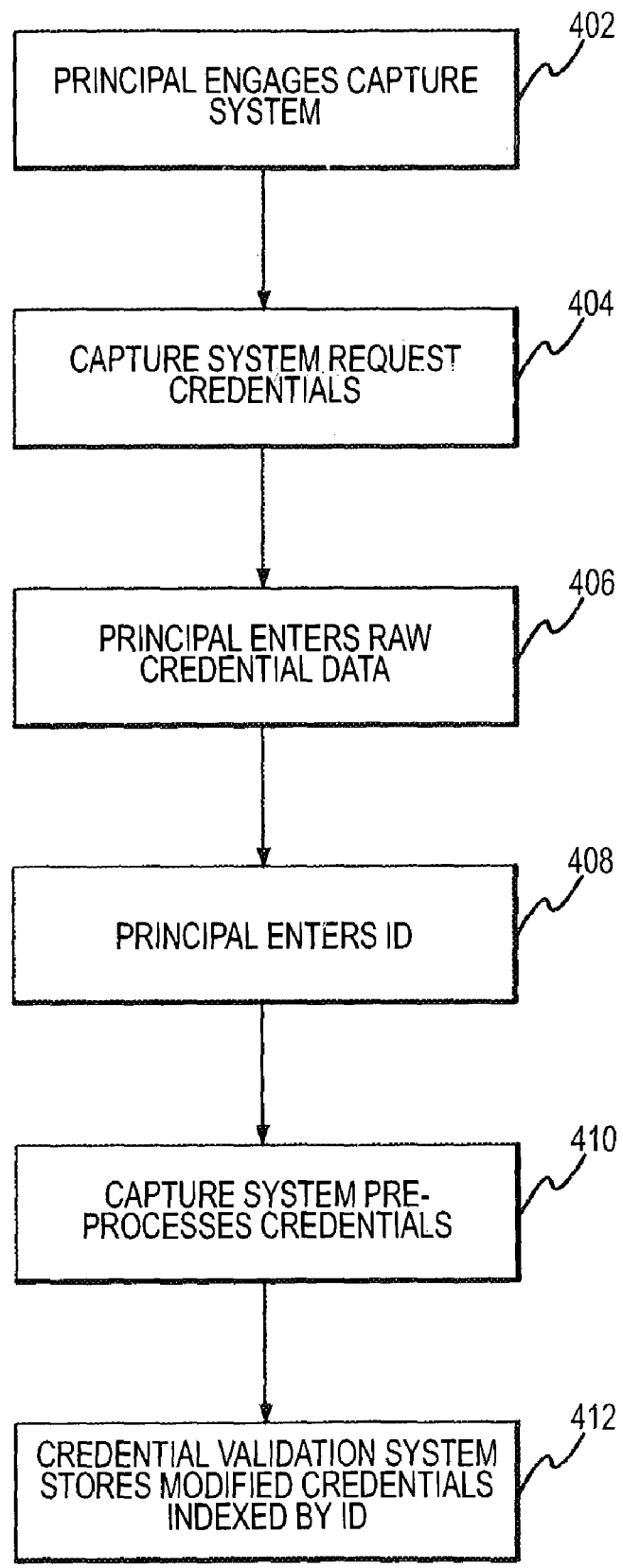
FIG. 4 depicts a credential validation method in accordance with one embodiment of the present invention.
Figure 5:
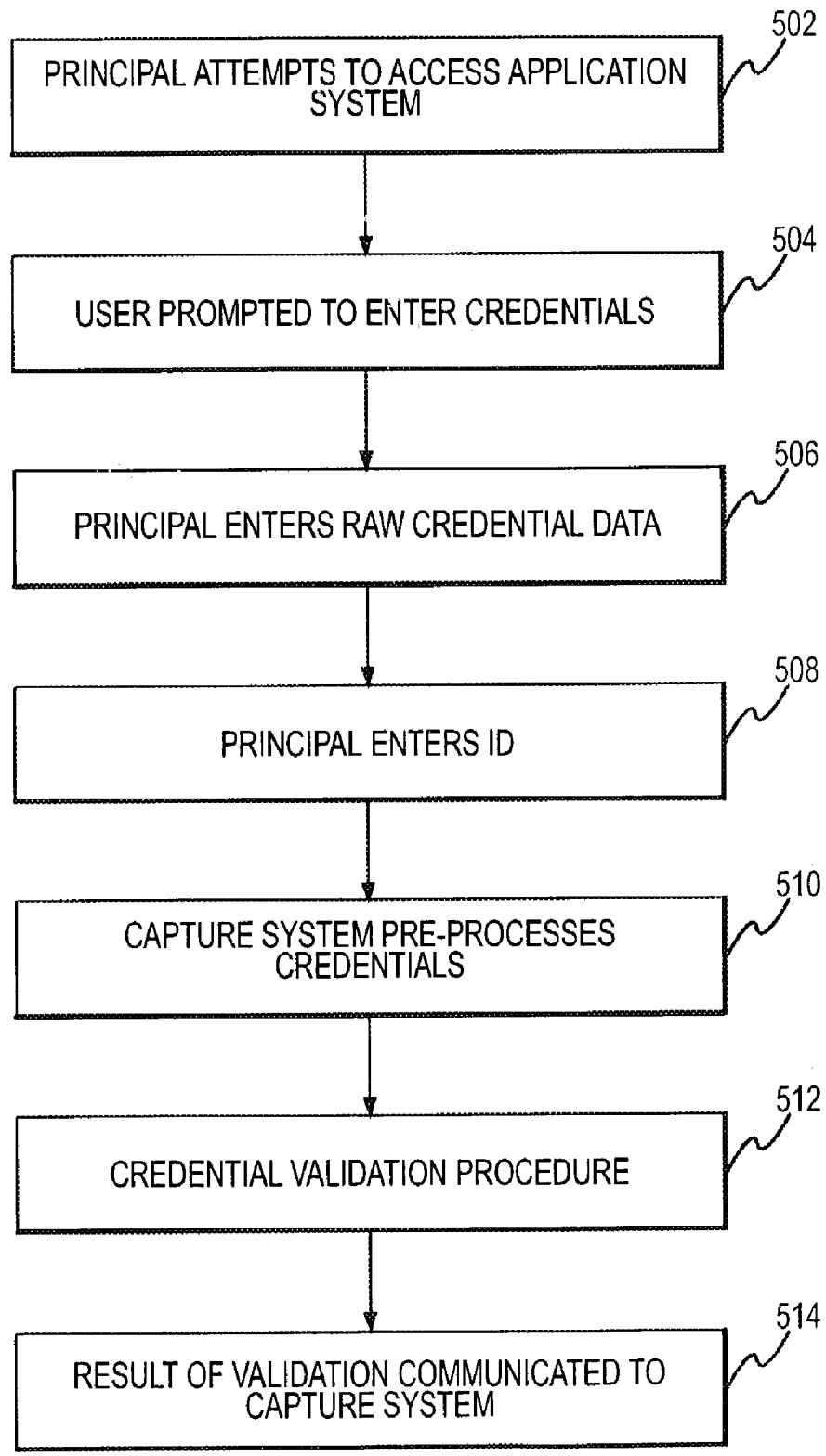
FIG. 5 depicts a credential validation method in accordance with one embodiment of the present invention.

Referring now to FIGS. 1, 4 and 5, an exemplary validation process will be described in further detail. Initially, the credentials are suitably stored. That is, the principal engages the application system 202 or capture system 102 (step 402). Capture system 102 or application system 202 then requests that the principal enter credentials (step 404). The principal engages the credential interface and enters the raw credential data (step 406) and identification (step 408). Capture system 102 optionally communicates with credential validation system 106 in preparation for storage of credentials. This may optionally communicate information about the principal whose modified credentials are to be stored, and may entail facilitating negotiation of the preprocessing and credential modifications to be employed. This may also entail facilitating negotiation of cryptographic protocol in the establishment of a secure session as well as other negotiation on behalf of application system or other system to establish the nature of the relationship between principal, application, and receiving system. For example, there may be an enrollment list or interface that facilitates identifying principals who are authorized to use the receiving system, as might occur when there is a business relationship between application system and receiving system, e.g., the payment of a fee for use of credential validation system 106.

Capture system 102 receives raw credential data and preprocesses that data (step 410). More particularly, in one embodiment, the capture system facilitates modifying the preprocessed credentials and submits them to credential validation system 106 along with the identification of the principal (ID) for storage (step 412). In an exemplary embodiment, this data is suitably encrypted.

In addition to the credential data, at some time before, after, and/or during the submission of modified credential data, application system 202, capture system 102, or other such system (or possibly manual or automated administration), also communicates the credential match threshold value and, optionally, the weighting vector. This data, which may be encrypted for communication, is suitably stored in credential validation system 106 in one embodiment. Credential validation system 106 stores the modified credentials indexed by the ID within a database. In an exemplary embodiment, encrypted information is decrypted prior to this step. Optionally, additional information is exchanged to confirm successful storage of credentials for the principal.

The principal may then attempt to access application system functionality for which the application system 202 has been constructed to trigger credential validation (step 502). Trigger of credential validation facilitates application system 202 communicating with capture system 102, and either capture system 102 or application system 202 prompts the user to enter his or her credentials (step 504). The principal then engages the credential interface within capture system 102 and enters his raw credential data and ID (steps 506 and 508). Capture system 102 optionally communicates with credential validation system 106 in preparation for storage of credentials. This may optionally communicate information about the principal whose modified credentials are to be stored, and may entail negotiation of the preprocessing and credential modifications to be employed. This may also entail negotiation of cryptographic protocol in the establishment of a secure session or other negotiation on behalf of application system or other to establish the nature of the relationship between the parties.

Capture system 102 may then receive raw credential data and preprocesses that data (step 510). Capture system 102 suitably facilitates modification of the preprocessed credentials and submits them to credential validation system 106 along with the identification of the principal (ID). In an exemplary embodiment this information is encrypted. Credential validation system 106 receives the credentials and ID and, if applicable, decrypts that information. Credential validation system 106 then retrieves the modified stored credentials by use of the ID within the indexed database or similar system.

In an exemplary embodiment, credential validation system 106 facilitates execution of a credential validation step (step 512), for example, discrete N-ball Intersection or any of the various embodiments described below. This step operates on input of the modified stored credential set and the modified received credential set. The output of the credential validation algorithm (success or failure) is communicated back to capture system 102 along with optional additional information (step 514).

In order to further explicate the invention and the various exemplary credential validation procedures, a number of exemplary mathematical formalisms will now be presented. For additional background information regarding such mathematical concepts, a wide variety of basic references may be consulted, including, for example, TOM M. APOSTOL, MATHEMATICAL ANALYSIS (Addison-Wesley, 1974).

Initially, Ciphertext, C, is created from a message, M, by application of an encryption function, E. This is captured by the following expression:

$$E(M)=C$$

In the reverse process, there is a decryption function D that operates on the ciphertext to reproduce the original message, M:

$$D(C)=M$$

Application of this approach includes formal definition of the functions, as well as formal specifications of the mathematical domains of C and M, which suitably comprise blocks or strings of binary data, which can then be represented in any number of ways, for example, as large integers.

Specification of a set of mathematical equations that identifies such relationships does not guarantee the existence or solvability of the underlying problem. For example, there may or may not be a computer algorithm that implements E or D for all elements of the domains M and C. An important consideration is also the computability of such a function. That is, in many cases it is theoretically possible to perform a computation, such as random search, but it may not be practically feasible to do so given limitations on time, storage, computational power, and the like.

In equations such as the above, subscripts and additional parenthetic notation is often used to describe specific instances of functions and variables. For example, the following equations describe the above relationships for asymmetric (also called public key) cryptography. In this case, the subscripts $K_{pub}$ and $K_{priv}$ are used to denote cryptographic functions that include as input the public and private keys respectively:

$$E_{Kpriv}(M)=C$$

$$D_{Kpub}(C)=M$$

The following alternative way of representing the above equations explicitly identifies the fact that the encryption and decryption algorithms include appropriate keys as input:

$$E(K_{priv}, M)=C$$

$$D(K_{pub}, C)=M$$

In addition, the following conventions will be used in notation:

{1,2}—the set containing elements 1 and 2.

s.t.—such that, as in {x s.t. x is divisible by 7}.

in—set membership, as in x in X, which means some element x in the set X.

Thereis—There exists, as in the proposition Thereis x in X where x is divisible by 7.

Forall—For all, as in Forall x in X, Thereis y in Y where xRy.

if . . . then—denotes logical implication, for example if $xR_1y$ then $xR_2y$.

iff . . . then—denotes logical bi-implication, short for if and only if, as in iff $xR_1y$ then $xR_2y$.

It should be noted that references to cryptographic functions, cryptographic keys, and the like, may be interpreted in a broad sense, without necessarily implying true cryptographic means as may be documented in Schneir's text cited above. For example, in the following sections, the term encryption may be used loosely, and may denote non-cryptographic algorithms such as the one-way hash referenced above. Cryptographic messages may be equated to credential sets, and references to modified credentials are applicable to encrypted credentials. In practice, modified credentials might be created by a series of algorithmic process steps which may or may not be considered cryptographic in the conventional sense.

To begin discussion of the mathematical basis for the present invention, it is instructive to formalize the context and formulation of the credential validation test. In this regard, the following denotations will be used in this discussion:

$M_{pres}$ is the presented credential set.

$M_{store}$ is the stored credential set.

V is the validation relation.

T is the relation that denotes consistency between unencrypted credentials.

$E_{pres}$ is the encryption function for presented credentials.

$E_{store}$ is the encryption function for stored credentials.

$C_{pres}$ is the modified presented credential set.

$C_{store}$ is the modified stored credential set.

As described above, the basic premise is that, given a presented credential set, $M_{pres}$, and a stored credential set, $M_{store}$, there should be a way to test for consistency, as defined in the above sections. Note that this differs from logical consistency, and unless otherwise specified, should be interpreted as follows:

$$T(M_{pres}, M_{store})$$

Note that an alternative notation for this mathematical relation would be $M_{pres} \vee M_{store}$.

This relation captures the real-world notion of consistency in credentials, given some means of electronically capturing those credentials so as to create $M_{pres}$ and $M_{store}$. Formulating this expression as this kind of mathematical relation means we explicitly identify the possible values of the messages as B, where B is the set of all binary numbers:

Forall i in B and Forall j in B, T(i,j) iff i is consistent with j.

In this case $M_{pres}$ is used to denote i, when i is the presented credential set, and $M_{store}$ to denote j when j is the stored credential set. What this states is that any i and j in the relation T should be consistent, and any i and j not in the relation T should not be consistent. Note that in application there may be discrepancies between the real-world notion of consistency and the mathematical relation T for a given implementation and context. For example, biometric credentials are inexact by nature: a real world system might not recognize a smudged fingerprint correctly.

The objective of credential validation is to computationally deduce conclusions about the relations. In accordance with the present invention, the validating system does not actually have direct access to $M_{pres}$ and $M_{store}$, however, it is still desired to determine the consistency of $M_{pres}$ and $M_{store}$ as presented. In order to do so, the system of the present invention operates on the information that it does have access too, i.e., $C_{pres}$ and $C_{pres}$.

As mentioned above, the present invention applies a modification to each credential such that:

$$E_{pres}(M_{pres})=C_{pres}$$

$$E_{store}(M_{store})=C_{store}$$

The desired credential validation may then be formulated as:

$$T(M_{pres}, M_{store}) \text{ iff } V(C_{pres}, C_{store}) \text{ where } E_{pres}(M_{pres})=C_{pres} \text{ and } E_{store}(M_{pres})=C_{store}$$

That is, the validation relation for the modified credentials is true only when the unmodified credentials are consistent. The problem to solve may then be expressed as:

Given B, where $M_{pres}$ in B and $M_{store}$ in B; and

Given some B' where $C_{pres}$ in B' and $C_{store}$ in B';

There is $E_{pres}$, $E_{store}$, and V s.t.:

$$T(M_{pres}, M_{store}) \text{ iff } V(C_{pres}, C_{store}) \text{ where } E_{pres}(M_{pres})=C_{pres} \text{ and } E_{store}(M_{store})=C_{store}$$

The crux of the above expression is that it is desired to find functions $E_{pres}$ and $E_{store}$, and also find a relation V, in order to prove the validity of the postulate. Their existence may lead to a solution to the computational problem laid out in this discussion, so long as there is a definition of algorithms for computing $E_{pres}$ and $E_{store}$, and also for testing V, and the following special properties are met.

For the goal of risk minimization to be met, calculation of inverses should be computationally difficult or impossible, while the modification of the biometric data should be easy; that is:

$E_{pres}(M_{pres})$ and $E_{store}(M_{store})$ should be easy to compute, and $E_{pres}^{-1}(C_{pres})$ and $E_{store}^{-1}(C_{store})$ should be hard to compute.

Note that inverses of $E_{pres}$ and $E_{store}$ are denoted $E_{pres}^{-1}$ and $E_{store}^{-1}$. Using the alternative denotation where D denotes the inverse, $D_{pres}(C_{pres})$ and $D_{store}(C_{store})$ should be hard to compute.

An important distinction between the use of the above formulations in describing this problem from their use in describing cryptography is that we are not seeking to make $E_{pres}^{-1}$ and $E_{store}^{-1}$ easy under any circumstances. Cryptography introduces the notion of a key or key pair that makes $E_{pres}^{-1}$ and $E_{store}^{-1}$ easy to compute when you have the appropriate key. In that sense, our functions might be better viewed as one-way hashes than as cryptographic encryption, although the naming is less significant than the mathematical properties described herein. Users of the present invention wish to absolutely prevent the systems and users of the validation algorithm from being able to directly see the values of their credentials.

With raw equivalence there are some special properties for T, concerning the definition of the problem itself In fact, this is the case for all of the scenarios that were above classified as equivalence instead of consistency. T is simply equality. This can be stated as follows:

$$T(M_{pres}, M_{store}) \text{ iff } M_{pres} = M_{store}$$

Additionally, raw equivalence imposes special properties on $E_{pres}$ and $E_{store}$. Specifically, these functions are the Identity functions: they output exactly the same value as they are input. Algorithmically, this would be considered a null process step. The modification does nothing:

$$\text{Forall } M_{pres} \text{ in B, } E_{pres}(M_{pres}) = M_{pres}$$

$$\text{Forall } M_{store} \text{ in B, } E_{stor}(M_{store}) = M_{store}$$

As mentioned above, raw equivalence does nothing to mitigate risk of systems theft.

As far as the validity relation, V, is concerned, it is the equality relation:

$$V(C_{pres}, C_{store}) \text{ iff } C_{pres} = C_{store}$$

Putting all of these expressions together allows the desired proposition of consistency to be deduced given $C_{pres}$ and $C_{store}$ as input. In summary, given $C_{pres}$ and $C_{store}$, such a system can test $V(C_{pres}, C_{store})$ to determine $T(M_{pres}, M_{store})$. Specifically, iff $C_{pres} = C_{store}$ then $T(M_{pres}, M_{store})$.

With one-way equivalence, a one-way operation is introduced, presumably a hash or encryption. The same operation is used for both presented and stored credentials. We can express the fact that the two operations are equivalent as follows:

$$\text{Forall M in B, } E_{pres}(M) = E_{stor}(M)$$

As far as the validity relation, V, is concerned, it is the equality relation.

$$V(C_{pres}, C_{store}) \text{ iff } C_{pres} = C_{store}$$

Once again, putting this together allows us to deduce the proposition of consistency, knowing only $C_{pres}$ and $C_{store}$. One skilled in the art could readily offer proof of this. In summary, given $C_{pres}$ and $C_{store}$, such a system can test $V(C_{pres}, C_{store})$ to determine $T(M_{pres}, M_{store})$. Specifically, iff $C_{pres} = C_{store}$ then $T(M_{pres}, M_{store})$.

Unlike the equivalence scenarios, we can not reduce the raw equivalency problem to one of answering whether $M_{pres} = M_{store}$. We therefore leave T to represent the abstract consistency relation for which we desire a proposition. We are seeking some expression that allows us to deduce $T(M_{pres}, M_{store})$.

As with raw equivalence, $E_{pres}$ and $E_{store}$ are the Identity functions.

$$\text{Forall } M_{pres} \text{ in B, } E_{pres}(M_{pres}) = M_{pres}$$

$$\text{Forall } M_{store} \text{ in B, } E_{stor}(M_{store}) = M_{store}$$

As mentioned in the Background section, this approach does not sufficiently mitigate risk of systems theft.

In accordance with the present invention, we presume algorithmic processing in the relation V. Note that V is not the equality relation. As cited above, algorithmic evaluation of V is presumed to be some type of pattern matching that operates over the appropriate domain. For example, the domain, B, might comprise binary encodings of two-dimensional iris scan data, or binary encodings of three dimensional handwriting biometrics (the third dimension being time). Without loss of generality, we might draw from two separate domains where $M_{pres}$ in $B_{pres}$ and $M_{store}$ in $B_{store}$. Observe that these mathematical domains are in fact the same, but the semantic denotation differs. Both domains have already been defined to be binary data, which suffices, regardless of what that data represents.)

Again, putting all of this together allows us to deduce the desired proposition of consistency, given $C_{pres}$ and $C_{store}$ as input. In summary, given $C_{pres}$ and $C_{store}$, such a system can test $V(C_{pres}, C_{store})$ to determine $T(M_{pres}, M_{store})$ Specifically, iff $V(C_{pres}, C_{store})$ then $T(M_{pres}, M_{store})$.

Systems and methods in accordance with exemplary embodiments of the present invention apply one-way consistency to help solve the credential validation problem. The formalization is the same as the abstract representation of the general problem above. We do not simplify the problem specification in testing for T, but we do not introduce any simplifications around $E_{pres}$, $E_{store}$, or the relationship between the two. Furthermore, we stipulate that inverse $E_{pres}^{-1}$ and $E_{store}^{-1}$ are hard to compute:

Given B, where $M_{pres}$ in B and $M_{store}$ in B; and
Given some B' where $C_{pres}$ in B' and $C_{store}$ in B';
There is $E_{pres}$, $E_{store}$, and V s.t.:

$$T(M_{pres}, M_{store}) \text{ iff } V(C_{pres}, C_{store}) \text{ where } E_{pres}(M_{pres}) = C_{pres} \text{ and } E_{store}(M_{store}) = C_{store}$$

Since we identify this scenario as distinct from the preceding two, we may wish to also note that $E_{pres}$ and $E_{store}$ are not the identity functions (although this is already a logical consequence of stating that $E_{pres}^{-1}$ and $E_{store}^{-1}$ are hard to compute).

The following section describes three exemplary embodiments, each a separate exemplary solution to the problem. These exemplary solutions are referred to as (1) Weighted Quorum of Exact Matches, (2) Discrete N-Ball Intersection, and (3) Client Algorithm with Encryption.

Exemplary Embodiment 1

Weighted Quorum of Exact Matches

One embodiment of the present invention facilitates verification of credentials when the credentials comprise a set of data points, and where a match is computed algorithmically as a weighted sum of the number of exact matches of individual credentials within the set. The data points within the credential set can be assigned an ordering (ordered set or sequence) that is common to both the presented and stored formulations, i.e., the canonical ordering. The term credential sequence may also be used to include the canonical ordering of the credential set.

A method in accordance with an embodiment involves the pairwise comparison of each modified credential from the stored and presented credential set proceeding from the first to the last credential pair in the canonical ordering. The method includes a match threshold, which is a numerical value that describes the minimum number of pairwise matches under which the algorithm determines credential validity. The algorithm optionally includes a weighting vector, which is a sequence of numerical values that assigns a weight to each pairwise comparison, thus allowing certain comparisons to have a greater contribution to the calculation of the overall match and to therefore be considered more important to the credential validation. When no weighting is included, the optional weighting vector would be the unit vector (all values are 1), which reduces to a simpler algorithm that omits or limits the process step of computing weights for each pairwise comparison.

More formally stated, the algorithm prescribes a computation of validity by comparison of a score to a threshold, given inputs as follows:

S=Score, a numeric value, a member of some suitable computational domain such as floating point numbers, quotients, Integers, etc.

$T_h$=Threshold, a numeric value, a member of some suitable computational domain such as floating point numbers, quotients, Integers, etc.

V=<$v_1, v_2, \ldots, v_n$>, Vector of weighting values belonging to some suitable computational domain such as floating point numbers, quotients, Integers, etc.

V=<1, 1, ..., 1>, the unit vector, when weighting is not employed by embodiment of the invention.

n=the number of credentials in the credential sequences

Note that the actual number of credentials, n, and the specific domains (such as the range of possible values and their representations) will vary with the specific type of credential set, interface devices, transducers, feature extraction algorithms, and/or the like.

Furthermore, additional processing of credential sets may be employed so as to allow for exact matches in the pairwise comparisons. For example, rather than inputting a small number of credentials that are nearly infinitely variable (and which might almost never give an exact match by the described algorithm), the system may modify the credentials to store and present a much larger set of credentials which vary to a lesser extent individually, but which, taken together, vary to a large extent due to the combinatorial permutations of the values within the credential sequence.

Credential are considered valid if and only if Score >=Threshold:

$T(M_{pres}, M_{store})$ iff $S >= T_h$ $C_{pres}$=<$C_{pres,1}, C_{pres,2}, \ldots, C_{pres,n}$> is the modified presented credential sequence.

$C_{store}$=<$C_{store,1}, C_{store,2}, \ldots, C_{store,n}$> is the modified stored credential sequence.

As described in the above section, the solution includes one-way functions for generation of modified credentials:

$E_{pres}(M_{pres})$ and $E_{store}(M_{store})$ should be easy to compute.
$E_{pres}^{-1}(C_{pres})$ and $E_{store}^{-1}(C_{store})$ should be hard to compute.

Calculation of Score, S, uses an equality test function, here denoted "==". This is a binary equality operator that maps discrete values into {0,1} where 1 denotes equality.

The algorithm computes the following to determine the score:

$$S = v_1*(C_{1,pres} == C_{1,store}) + v_2*(C_{2,pres} == C_{2,store}) + \ldots v_n*(C_{n,pres} == C_{n,store})$$

Therefore, the Boolean value that is returned by the credential validation is a test of the following inequality:

$$v_1*(C_{1,pres} == C_{1,store}) + v_2*(C_{2,pres} == C_{2,store}) + \ldots v_n*(C_{n,pres} == C_{n,store}) >= T_h$$

As mentioned above, when the optional weighting is not employed, V is the unit vector, and this equation reduces to the following:

$$(C_{1,pres} == C_{1,store}) + (C_{2,pres} == C_{2,store}) + \ldots (C_{n,pres} == C_{n,store}) >= T_h$$

Exemplary Embodiment 2

Discrete N-Ball Intersection

In differentiating the previous embodiment, discrete N-ball intersection supports inexact matching of individual elements of a credential set. For each individual element in the credential set, it effectively applies a weighted distance function for comparison to the threshold, although it is specially modified to support the fact that a distance measurement cannot be applied to conventionally modified data. It does so by meeting several specific processing criteria. Like the weighted quorum of exact matches, it provides a weighted cost function and threshold. However, rather than performing a simple equality test for each element of pairwise comparison, a special kind of set intersection is applied.

In the special type of set intersection, several sequences of modified credentials are generated in modifying both the presented and stored credentials. Rather than generating a single modified value for each individual credential data point, a number of related values are generated, to which the modification algorithm is applied. The essence of this embodiment is that these values are "close enough" to a match, in contrast to the exact match of the former embodiment. In the vernacular of the mathematical art, the algorithm generates an N-ball in an N-dimensional metric space (which is the kind of problem space where distance function the values). That is to say, the N-ball is a set of data points that are within a prescribed distance from the center of the N-ball. (The "N" is derived from the notion that all points are less than or equal to a distance of "N" from the center of the ball. Of course, balls connote common sense denotation of a three-dimensional space, whereas the mathematical vernacular prescribes no limit on the dimensionality of the data points. The N-dimensional space might have 1, 2, 3, or any other number of dimensions.

An intuitive way of viewing this algorithm is that it generates successive series of point from shells that are increasingly distant from the credential data point. First, the exact credential element is modified and transmitted (or stored). Then all points of less than a certain distance are similarly modified and transmitted. This can be thought of as a "shell" of points. Next, points that are in the next shell are transmitted (i.e., less than twice the first distance but not previously transmitted in the first shell). Then points in the next shell are transmitted (i.e., more than twice but less than three times the distance). This continues for a prescribe number of iterations. When the match occurs during comparison, as described below, a value is assigned for the closeness of the match. Whereas conventional distance in an N-dimensional metric space uses a formula like distance=SQRT($(p_{11}-p_{12})^2 + (p_{21}-p_{22})^2 + \ldots + (p_{n1}-p_{n2})2$), the present invention simply assigns a weight, which can be considered equivalent to a distance, which corresponds to how close the shell is to the initial credential element.

In accordance with this embodiment, a weighting scheme is used so that a succession of N-balls may be utilized, starting with a small one (and highest weight), followed by a larger one (with weight increasing in proportion to the radius of the N-ball), and so on until the last N-ball is reached. Since the processing starts in the center and moves outward through successive shells, this approach might also be referred to as N-shell intersection.

A crux of this embodiment is that set intersection can be performed by pairwise comparisons of individual values as in the former approach. The general approach is as follows. Given two sets, X and Y, where $X=\{x_1, x_2, \ldots, x_n\}$ and $Y=\{y_1, y_2, \ldots, y_n\}$, the system computes the following sequence of tests using the equality operator as above. A successful test returns Boolean true and the test algorithm may terminate (short circuit evaluation) if performance optimization is desired. The notation uses Boolean OR operator with sub and superscripts to denote the range of tests that the overall operation is composed of $$OR_{i=1 \ldots n, j=1 \ldots n}(x_n == y_n)$$

The above is a notational convenience for representing the Boolean disjunction of all equality operations, i.e.:

$x_1 == y_1$ OR $x_2 == y_1$ OR

... OR $x_n == y_1$ OR $x_1 == y_2$ OR $x_2 == y_2$ OR

... OR $x_n == Y_2$ OR $x_1 == y_n$ OR $x_2 == y_n$ OR

... OR $x_n == y_n$

An exemplary creation of an N-ball of points progresses as follows. Points can be generated by taking the initial values of the center point and adding integer multiples of some quantization value. The initial center point itself should also be quantized. This is part of the preprocessing. This quantization is advantageous to ensure that the N-ball points are "synchronized" with one another. The fact that each n-ball is composed of a finite series of discrete points as opposed to an infinite series of continuous points lends to the naming of this solution.

Given some data point, $d=\langle d_1, d_2, \ldots d_n \rangle$, a quantized point d' is created such that d' is the closest point in the metric space where the following quantization condition is met. Quantization uses the notion of a discrete reference point, which is typically the mathematical origin, $\langle 0, 0, \ldots 0 \rangle$, but which might be any point in the n-space. We will denote this point by O, and the exact values of it are not pertinent to the discussion. It will be called the quantization reference.

A set S of points in n-space is said to be quantized (meets the quantization condition) iff for all s in S, and for all dimensions i, there exists some integer k such that:

$$k*s_i - o_i = 0$$

where $o_i$ is the quantization reference O.

Quantization of n-ball points may be visualized as a lattice of points contained within a spherical region in n-space. One skilled in the art will appreciate that various methods may be employed for finding the nearest quantized point. For example, a quantized point generator might be employed as discussed below.

In applying the quantization condition and deriving an algorithm, it should be noted that k is, in one embodiment, fixed and common to all modifications of credentials. It furthermore may vary by dimension, therefore leading to a more general notion of the primary quantization vector, K, where $k=\langle k_1, k_2, \ldots k_n \rangle$. Each dimension may be quantized with different levels of "coarseness."

Given an initial point $p=\langle p_1, p_2, \ldots p_n \rangle$, where p is some quantized n-space, and given the quantization vector K, we can generate points by adding integer multiples of the dimensional value of the quantization vector to derive a series of points.

The general form is:

$\langle p_1+(j_1*k_1), p_2+(j_2*k_2), \ldots p_n+(j_n*k_n) \rangle$, where each $j_i$ varies independently and takes on values 0, 1, −1, 2, −2, etc., thereby generating all points within the hypercube around the initial point.

For example, $p=$ $\langle p_1+(0*k_1), p_2+(0*k_2), \ldots p_n+(0*k_n) \rangle,$ $\langle p_1+(1*k_1), p_2+(0*k_2), \ldots p_n+(0*k_n) \rangle,$ $\langle p_1+(-1*k_1), p_2+(0*k_2), \ldots p_n+(0*k_n) \rangle,$ $\langle p_1+(0*k_1), p_2+(1*k_2), \ldots p_n+(0*k_n) \rangle,$ $\langle p_1+(0*k_1), p_2+(-1*k_2), \ldots p_n+(0*k_n) \rangle,$

...

$\langle p_1+(0*k_1), p_2+(0*k_2), \ldots p_n+(1*k_n) \rangle,$ $\langle p_1+(0*k_1), p_2+(0*k_2), \ldots p_n+(-1*k_n) \rangle,$ $\langle p_1+(1*k_1), p_2+(1*k_2), \ldots p_n+(0*k_n) \rangle,$ $\langle p_1+(1*k_1), p_2+(-1*k_2), \ldots p_n+(0*k_n) \rangle,$ $\langle p_1+(-1*k_1), p_2+(1*k_2), \ldots p_n+(0*k_n) \rangle,$ $\langle p_1+(-1*k_1), p_2+(-1*k_2), \ldots p_n+(0*k_n) \rangle,$

...

$\langle p_1+(1*k_1), p_2+(0*k_2), \ldots p_n+(1*k_n) \rangle,$ $\langle p_1+(1*k_1), p_2+(0*k_2), \ldots p_n+(-1*k_n) \rangle,$ $\langle p_1+(-1*k_1), p_2+(0*k_2), \ldots p_n+(1*k_n) \rangle,$ $\langle p_1+(-1*k_1), p_2+(0*k_2), \ldots p_n+(-1*k_n) \rangle,$

...

$\langle p_1+(0*k_1), p_2+(1*k_2), \ldots p_n+(1*k_n) \rangle,$ $\langle p_1+(0*k_1), p_2+(1*k_2), \ldots p_n+(-1*k_n) \rangle,$ $<p_1+(0*k_1), p_2+(-1*k_2), \ldots p_n+(1*k_n)>$, $<p_1+(0*k_1), p_2+(-1*k_2), \ldots p_n+(-1*k_n)>$, $\ldots$ $<p_1+(1*k_1), p_2+(1*k_2), \ldots p_n+(1*k_n)>$, $<p_1+(1*k_1), p_2+(1*k_2), \ldots p_n+(-1*k_n)>$, $<p_1+(1*k_1), p_2+(-1*k_2), \ldots p_n+(1*k_n)>$, $<p_1+(1*k_1), p_2+(-1*k_2), \ldots p_n+(-1*k_n)>$, $<p_1+(-1*k_1), p_2+(1*k_2), \ldots p_n+(1*k_n)>$, $<p_1+(-1*k_1), p_2+(1*k_2), \ldots p_n+(-1*k_n)>$, $<p_1+(-1*k_1), p_2+(-1*k_2), \ldots p_n+(1*k_n)>$, $<p_1+(-1*k_1), p_2+(-1*k_2), \ldots p_n+(-1*k_n)>$, then:

$<p_1+(2*k_1), p_2+(0*k_2), \ldots p_n+(0*k_n)>$, $<p_1+(-2*k_1), p_2+(0*k_2), \ldots p_n+(0*k_n)>$, and so on.

Note that this generator produces what might be called a discrete filled N-cube (also known as hypercube) of points, as the algorithm does not test for whether points are within a spherical region of prescribed maximum distance from initial point p. However, one skilled in the art can readily recognize that all points are contained within the maximum distance represented by a vertex of the hypercube. In an alternative embodiment, the algorithm may choose to retain points of the hypercube instead of a sphere.

The number of points grows with combinatoric complexity with respect to the number of dimensions, placing a reasonable upper bound on the amount of points to generate and transmit over the network. However, this does not sufficiently affect the general usefulness of the algorithm, given that it is presently feasible for a certain range distance under today's technology and that future technology will support transmission and processing of significantly larger sets of data points.

An exemplary basic algorithm for discrete n-ball intersection may be presented now, using the above formulations. Each element of the credential set may consist of a set of values, as may be derived by the scanning of features such as fingerprints (e.g., in 2 dimensions), or any other set of values. The algorithm first quantizes the data points of each value. This quantization starts with the credential set and, using a quantization vector, generates points that are increasingly distant from the initial credential set.

When the distance threshold of the first shell is reached, and all points within the threshold distance are generated, a marker is inserted into the sequence to signify that the next shell is being generated. This marker is optional, as the number of points in the first shell may be derived simply knowing the quantization vector, distance threshold, and behavior of the quantized point generator. The system then uses the quantized point generator to produce points in the next shell, behaving as for the first, continuing until all points within the next N-ball have been generated. This continues until the largest shell is generated. This algorithm proceeds accordingly for all points in the credential set. Different points may have their own domains and quantization.

For each pairwise comparison of a credential between stored and presented sets, the system then performs N-ball intersection by determining whether there is a match in the generated set. In one embodiment, the quantized point generation occurs when the initial credentials are presented and stored, and storage places all of the quantized credentials on the receiving system. Then at credential validation time only the modified quantized presented credential needs to be transmitted. Alternatively, set generation could occur every time that validation is needed. It is also possible to compute intersection of two sequences of discrete n-balls, one that is stored, and another that is generated from the presented credential.

In determining a match, two kinds of weighting may be employed. There are a number of derivative weighting schemes for alternative embodiments. The first kind of weighting is the shell weight for each shell in a comparison. If a compared point is contained in a given N-shell, then it is assigned a weight that would typically be inversely proportionate to the distance of that N-shell from the center. So the first shell of distance k might get weight of 12, the second shell of distance 2 k might get weight of 6, the third shell of distance 3 k might get weight 4, etc. This is referred to as the shell weight.

The second kind of weighting scheme is as described in the above solution (credential weight), and applies to each of the credentials in the overall set (which effectively has its own N-ball). The weight assigned for a given pairwise comparison is the product of the shell weight and credential weight. The credential weight is effectively the "distance" between the presented and stored credential and the credential weight is the importance of that credential to the overall score.

Numerous other embodiments are contemplated by the present invention. For example, alternative embodiments accommodate the types of credentials typically encountered in authentication systems. For example, a fingerprint authentication system might employ credential sets that consist of vectors of data points that are triples, where the triple consists of an x coordinate, a y coordinate, and a descriptor of feature type (e.g., "loop"). Such a system would require that the interface generate these credentials from the raw data input to the fingerprint sensor (e.g., two dimensional array of electrical capacitance, optical density, etc.). Furthermore, processing would require that points be placed into a canonical ordering, which one of moderate skill in the art could readily prescribe. One such ordering would be to order data points first by feature type, then by distance from some prescribed point in the x-y coordinate system. In other variants, more than three dimensions might be employed, perhaps to capture the size and orientation of the feature characterized by a credential element. This discussion is intended to be illustrative only, actual implementations for fingerprint authentication may employ alternative interface processing and credential elements.

In the above described variation, a special hybrid of approaches might be employed. N-Ball intersection would be applied for the weighted distance comparison for the x and y coordinates, but exact matches would be required for the feature type. In this way, features of different types, albeit at the same locations, would not contribute to the overall similarity score that is compared to the threshold in the final weighting function. One might also decide that allowing for mismatched feature type could be a result of system (or human) error in feature analysis and might actually assign a non-zero weight to such a mismatch. This example points out the notion that the weighted quorum approach is really a special case of N-ball intersection. N-ball intersection reduces to the latter when the data set of points consists solely of the exact credential point alone. There are no additional shells to which non-zero distance measures may be assigned. If the credential points do not match exactly, then the comparison contributes zero to the overall score and the next pair is examined.

Note that a key variation in the above description is that each dimension can have its own domain, quantization, shell generation algorithm, shell distance assignments, and number of shells. The X and Y dimensions would preferably follow the N-ball intersection to derive values that closely correspond to conventional distance in a two-dimensional Cartesian coordinate space, whereas the element type dimension would require an exact match for the comparison to yield any non-zero contribution to the total score of the credential set.

In another embodiment, where no canonical ordering of points can be presumed, then all points of both stored and transmitted credentials sets are pairwise compared, and each comparison contributes appropriately to the total score.

Exemplary Embodiment 3

Client Algorithm with Encryption

In an alternative embodiment, the system upholds the main objective of never allowing credentials to exist in machine readable form on the authentication server; however, the roles and relationship between presenting client and authentication server are significantly modified. In this embodiment, the authentication server acts as a secure repository of previously stored credentials and the presenting client actually performs the credential validation. This approach would use public key cryptography to protect the privacy and integrity of credentials on the authentication server. It would also use public key cryptography to establish a trust relationship between the authentication server and the presenting client.

A method in accordance with this embodiment proceeds as follows. During registration, the user or system identifies an authentication server to trust for storage of credentials. The user would have previously obtained an asymmetric key pair, presumably in the form or a public and private digital certificate. Establishment of a trusted authentication server might entail validation of the server's digital certificate in accordance with accepted practices of public key infrastructure (PKI).

Having identified such a server, the server would be responsible for obtaining a public certificate for this user. The user next utilizes the biometric interface of a client computer that he trusts. The system then encrypts the biometric credentials and additional information with the user's public key that resides in a key store of the client computer, or perhaps in a smart card or similar trusted device. The encrypted message is, in on embodiment, also signed by the user's private key. The additional information might include information to be used for non-repudiation, such as a secure time stamp. Other information might also be used. This information would, in one embodiment, be securely associated with the user's ID in a way that can not be tampered with or observed. This would include the first signed and encrypted message to be embedded within a second message that includes the user ID, but which is time encrypted with the public key of the selected authentication server. It would, in one embodiment, also be signed by the user's private key.

Upon receipt, the authentication server validates the sender by using the sender's public key. The authentication server also decrypts the message by using its own private key. Assuming this has been successful and the message is valid, the authentication server can then extract the ID plus the signed and encrypted payload. This is stored in the secure data store. Additional encryption might be employed as well, such as encrypting the ID in a way that it is only recognized by the authentication server and client. The ID itself may simply be the public key of the user.

When the user subsequently desires validation, the user once again uses the biometric interface of the presenting client. The biometric credentials are stored only with the system of the presenting client. The user would also identify himself to the presenting client, presumably by use of smart card or password. For example, the presenting system might have the user's public certificate, which can be used to validate a signed message originating from the smart card that bears the user's private key. Once the user's identity is established, a secure message would be sent to the authentication server to request this user's encrypted credentials. Such a secure message would likely be signed by the private key of the user, and would presumably be encrypted as well.

Upon validation of the user's request, the authentication server would then retrieve the previously stored credentials for this user. If found, they would be returned in another secure message, presumably encrypted and signed by the authentication server. If not found, and error would be returned instead. After the client receives the credentials from the authentication server it would then need to decrypt the message and validate the server signature. Once this is done, the signed and encrypted payload would also need to be decrypted and the signature validated. Recall that the client itself had previously performed this encryption and signing. The client public key would be used to validate the signature and the client private key would be used to decrypt the final set of credentials. Once the credentials are decrypted, appropriate algorithms would perform credential validation, comparing the credentials just downloaded to those that were presented on the biometric interface.

In both registration and credential validation, SSL could be used to establish a secure connection between authentication server and presenting client. In this case, both server and client certificates would be included. Additionally, the server would need to perform additional validation of the identities of the other machine in the SSL exchange.

Other mechanisms may be present for the management of credentials, i.e., removal of credentials, removal of Principal (ID and associated credential data), and various state-setting operations that may include the principal or other users of the system, such as systems and/or security administrators to perform activities such as resetting of the status of a user, creation of new credentials, additional validation of credentials, and more.

The present invention is described with reference to various exemplary embodiments. However, changes and modifications may be made to various exemplary embodiments without departing from the scope of the present invention. These and other changes or modifications are intended to be included within the scope of the present invention as set forth in the appended claims.

The invention claimed is:

1. A method for facilitating credential validation comprising:

receiving, at a first computer, initial credentials and a user identifier, wherein said initial credentials are received from a biometric interface coupled to said first computer;

modifying said initial credentials using a first public key to create modified stored credentials;

adding, at said first computer, a first signature to said modified stored credentials by using a first private key;

embedding, at said first computer, said user identifier and said modified stored credentials within a second message, wherein said second message is encrypted using a public key of an authorization server;

adding, at said first computer, a second signature to said second message using said first private key;

transmitting said second message, from said first computer to a second computer, wherein the second computer validates said second message by using said first public key, decrypts said second message using a second private key, and stores said modified credentials;

receiving, at said first computer, presented credentials;

validating, at said first computer, said first private key received from a smartcard;

transmitting a request from said first computer to said second computer, wherein said request includes a third signature obtained from said first private key;

wherein said second computer validates said third signature using said first public key, and retrieves said modified stored credentials;

receiving, at said first computer, said modified stored credentials from said second computer, wherein said modified stored credentials includes a fourth signature from said second computer;

validating, at said first computer, said fourth signature;

decrypting, at said first computer, said modified stored credentials; and, performing, at said first computer, a credential validation procedure to determine whether a credential match threshold is met by matching values of said presented credentials and values of said decrypted modified stored credentials.

2. The method of claim 1, further comprising employing a client algorithm with encryption.

3. The method of claim 1, wherein said creating modified stored credentials comprises deriving stored credentials from biometric credentials.

4. The method of claim 3, wherein said biometric credentials include at least one of: iris scan data, retina scan data, fingerprint data, handwriting data, handprint data, voice stress analysis, and keyboard rate data.

5. The method of claim 1, comprising storing an identification (ID).

6. The method of claim 1, further comprising encrypting said modified received credentials.

7. The method of claim 6, further comprising encrypting said modified received credentials with public-key encryption.

8. A system for facilitating validation of credentials, said system comprising:
a network;
a capture system operatively coupled to said network, said capture system configured to:
receive initial credentials and a user identifier;
modify said initial credentials using a first public key to create modified stored credentials, wherein said initial credentials are received from a biometric interface coupled to said first computer;
add a first signature to said modified stored credentials by using a first private key;
embed said user identifier and said modified stored credential within a second message, wherein said second message is encrypted using a public key of an authorization server;
add a second signature to said second message using said first private key;
transmit said second message, from said capture system to a validation system, wherein said validation system validates said second message by using said first public key, decrypts said second message using a second private key, and stores said modified credentials;
receive presented credentials;
validate said first private key received from a smartcard;
transmit a request from said capture system to said validation system, wherein said request includes a third signature obtained from said first private key;
wherein said validation system validates said third signature using said first public key, and retrieves said modified stored credentials;
receive said modified stored credentials from said validation system, wherein said modified stored credentials includes a fourth signature from said validation system;
validate said fourth signature;
decrypt said modified stored credentials; and,
perform a credential validation procedure to determine whether a credential match threshold is met by matching values of said presented credentials and values of said decrypted modified stored credentials.

9. The system of claim 8, further comprising an application system operatively coupled to said network, said application system comprising an application for gaining access.

10. The system of claim 8, wherein said network is the Internet.

11. The system of claim 8, wherein said modified stored credentials are derived from biometric credentials.

12. The system of claim 11, wherein said biometric credentials includes at least one of iris scan data, retina scan data, fingerprint data, handwriting data, handprint data, voice stress analysis, and keyboard rate data.

13. The system of claim 8, further comprising a stored identification (ID) associated with said modified stored credentials.

14. The system of claim 8, wherein said modified received credentials are encrypted.

15. The system of claim 14, wherein said modified received credentials are encrypted by public key encryption.

* * * * *